(12) United States Patent
Keskitalo et al.

(10) Patent No.: US 9,686,704 B2
(45) Date of Patent: Jun. 20, 2017

(54) METHOD AND APPARATUS FOR TERMINAL MEASUREMENT CONFIGURATION IN MULTI-RADIO ACCESS TECHNOLOGY ENVIRONMENT

(75) Inventors: Ilkka Antero Keskitalo, Oulu (FI); Mikko Aleksi Uusitalo, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 206 days.

(21) Appl. No.: 14/128,448

(22) PCT Filed: Jun. 29, 2011

(86) PCT No.: PCT/IB2011/052869
§ 371 (c)(1),
(2), (4) Date: Dec. 20, 2013

(87) PCT Pub. No.: WO2013/001333
PCT Pub. Date: Jan. 3, 2013

(65) Prior Publication Data
US 2014/0119224 A1    May 1, 2014

(51) Int. Cl.
*H04W 24/10* (2009.01)
*H04W 24/06* (2009.01)
(Continued)

(52) U.S. Cl.
CPC ........... *H04W 24/10* (2013.01); *H04W 24/06* (2013.01); *H04W 88/06* (2013.01); *H04W 88/10* (2013.01)

(58) Field of Classification Search
CPC ...... H04W 24/00; H04W 24/10; H04W 88/06
See application file for complete search history.

(56) References Cited

U.S. PATENT DOCUMENTS

2010/0069012 A1* 3/2010 Sullivan ............. H04W 52/287
455/67.11
2010/0120431 A1* 5/2010 Hwang ................. H04W 36/06
455/436
(Continued)

FOREIGN PATENT DOCUMENTS

WO    WO-2010140797 A2    12/2010
WO    WO-2011000268 A1    1/2011
(Continued)

OTHER PUBLICATIONS

Rapporteur (Samsung). "Miscellaneous corrections (related to review in preparation for ASN.1 freeze)", 3GPP Draft; 3GPP TSG-RAN2 Meeting #74. Barcelona, Spain. May 2011.
(Continued)

*Primary Examiner* — Anh Ngoc Nguyen
(74) *Attorney, Agent, or Firm* — Mintz Levin Cohn Ferris Glovsky and Popeo, P.C.

(57) ABSTRACT

In accordance with an example embodiment of the present invention, a method comprises: acquiring configuration information for terminal measurements of carriers relating to network performance on said carriers, said carriers being carriers in a carrier aggregation for a terminal, the configuration information comprising at least two measurement configurations with one measurement configuration for a radio access technology; and performing terminal measurements on said carriers according to the configuration information. Related apparatus and computer program product are also described.

14 Claims, 3 Drawing Sheets

(51) Int. Cl.
*H04W 88/06* (2009.01)
*H04W 88/10* (2009.01)

(56) References Cited

U.S. PATENT DOCUMENTS

| | | |
|---|---|---|
| 2011/0143749 A1 | 6/2011 | Guo et al. |
| 2011/0269453 A1 | 11/2011 | Ranta-Aho et al. |
| 2011/0281578 A1* | 11/2011 | Narasimha .............. H04L 5/001 |
| | | 455/423 |

FOREIGN PATENT DOCUMENTS

| | | |
|---|---|---|
| WO | WO-2011041985 A1 | 4/2011 |
| WO | WO-2011050846 A1 | 5/2011 |
| WO | WO-2011069410 A1 | 6/2011 |
| WO | WO-2011095103 A1 | 8/2011 |

OTHER PUBLICATIONS

LG Electronics Inc. "Measurement Configuration Structure for Carrier Aggregation", 3GPP Draft; 3GPP TSG-RAN2 Meeting #67. Shenzhen, China. Aug. 2009.
Nokia Corporation et al. "FGI Bits and UE Capabilities in REL 10", 3GPP TSG-RAN2 Meeting #72bis. Dublin, Ireland. Jan. 2011.
3GPP TSG-RAN WG2 Meeting #72, R2-106414, "FGI bits and UE capabilities in REL10", Nov. 15-19, 2010.
3GPP TSG-RAN Meeting #43, R2-090367, "Corrections to feature group support indicators", Mar. 3-6, 2009.
PCT Search Report dated Mar. 22, 2012 for PCT application No. PCT/IB2011/052869.

\* cited by examiner

METHOD AND APPARATUS FOR TERMINAL MEASUREMENT CONFIGURATION IN MULTI-RADIO ACCESS TECHNOLOGY ENVIRONMENT

CROSS-REFERENCE TO RELATED APPLICATION

This application is a national stage application, filed under 35 U.S.C. §371, of PCT Application No. PCT/IB2011/0052869, filed on Jun. 29, 2011, the contents of which are incorporated herein by reference in their entirety for all purposes.

TECHNICAL FIELD

The present application relates to terminal measurement configuration in multi-radio access technology environment.

BACKGROUND

Operators perform manual testing and verification of a radio network by doing drive testing with specific measurement tools to collect data in order to verify the network deployment and operation. The third generation partnership project, 3GPP, is working on standardized solution to substitute manual testing by specifying features that would enable usage of commercial devices to support network verification and optimization by providing appropriate measurement reports for minimization of drive tests, MDT, purposes. Identified use cases are e.g. optimizations of network coverage, capacity, or mobility parameters, etc. These measurement reports could help operators to reduce manual testing of the network and therefore to lower the operational costs.

Two different modes have been defined for the MDT measurements, namely immediate MDT and logged MDT. Immediate MDT applies normal radio resource control, RRC, measurement configuration and reporting principles except the extension to request and report user equipment, UE, location as part of the measurement data. The reporting may be triggered by a separate "event" which may be the same events that are used for radio resource management, RRM, reporting. UE makes MDT measurements and immediate reporting when the UE is in radio resource control, RRC, connected mode. Logged MDT enables idle mode measurement results to be logged together with time and location information. The log may be reported at later stage when the connection has been set up again.

SUMMARY

Various aspects of examples of the invention are set out in the claims.

According to a first aspect of the present invention, a method comprises: receiving configuration information for terminal measurements of carriers relating to network performance on said carriers, said carriers being carriers in a carrier aggregation for a terminal, the configuration information comprising at least two measurement configurations with one measurement configuration for a radio access technology; and performing terminal measurements on said carriers according to the configuration information.

According to a second aspect of the present invention, an apparatus. comprises: at least one processor; and at least one memory including computer program code; the at least one memory and the computer program code configured to, with the at least one processor, cause the apparatus to perform at least the following: receive configuration information for terminal measurements relating to network performance on carriers, said carriers being carriers in a carrier aggregation from at least two radio access technologies, the configuration information comprising at least two measurement configurations with one for a radio access technology; and perform terminal measurements on said carriers according to the configured measurement configurations.

DESCRIPTION OF THE DRAWINGS

For a more complete understanding of example embodiments of the present invention, reference is now made to the following descriptions taken in connection with the accompanying drawings in which.

DETAILED DESCRIPTION

In carrier aggregation, CA, two or more carriers, typically referred to as component carriers, CCs, are aggregated for a terminal in order to support wider transmission bandwidths. In such a CA scenario, a terminal may have a primary carrier representing the primary serving cell as well as one or more aggregated secondary carriers representing the secondary serving cells. Current standards related to minimization of drive tests, MDT, do not address carrier aggregation. The combination of test information concerning different carriers within same band or over separate bands has not been specified.

The idea of aggregating multiple carriers to increase performance is included in both long term evolution, LTE, and high-speed packet access, HSPA. A logical step to fully leverage existing HSPA deployments and future LTE deployments is to aggregate the capacity of both systems and tie them together into a single mobile system. The LTE-HSPA, CA architectures is a future extension, which have been studied in 3GPP standardization. LTE-HSPA CA, motivated by being able to provide higher bit rates per user and better scheduling gain, enables operators to dynamically combine the capacity and peak data rates of both LTE and HSPA bands. LTE-HSPA CA is similar to LTE CA or HSPA multi-carrier, MC in a multi-radio access technology, multi-RAT, environment where both LTE and HSPA systems coexist.

An example embodiment of the present invention and its potential advantages are understood by referring to FIG. 1 through FIG. 5 of the drawings.

Figure 1:
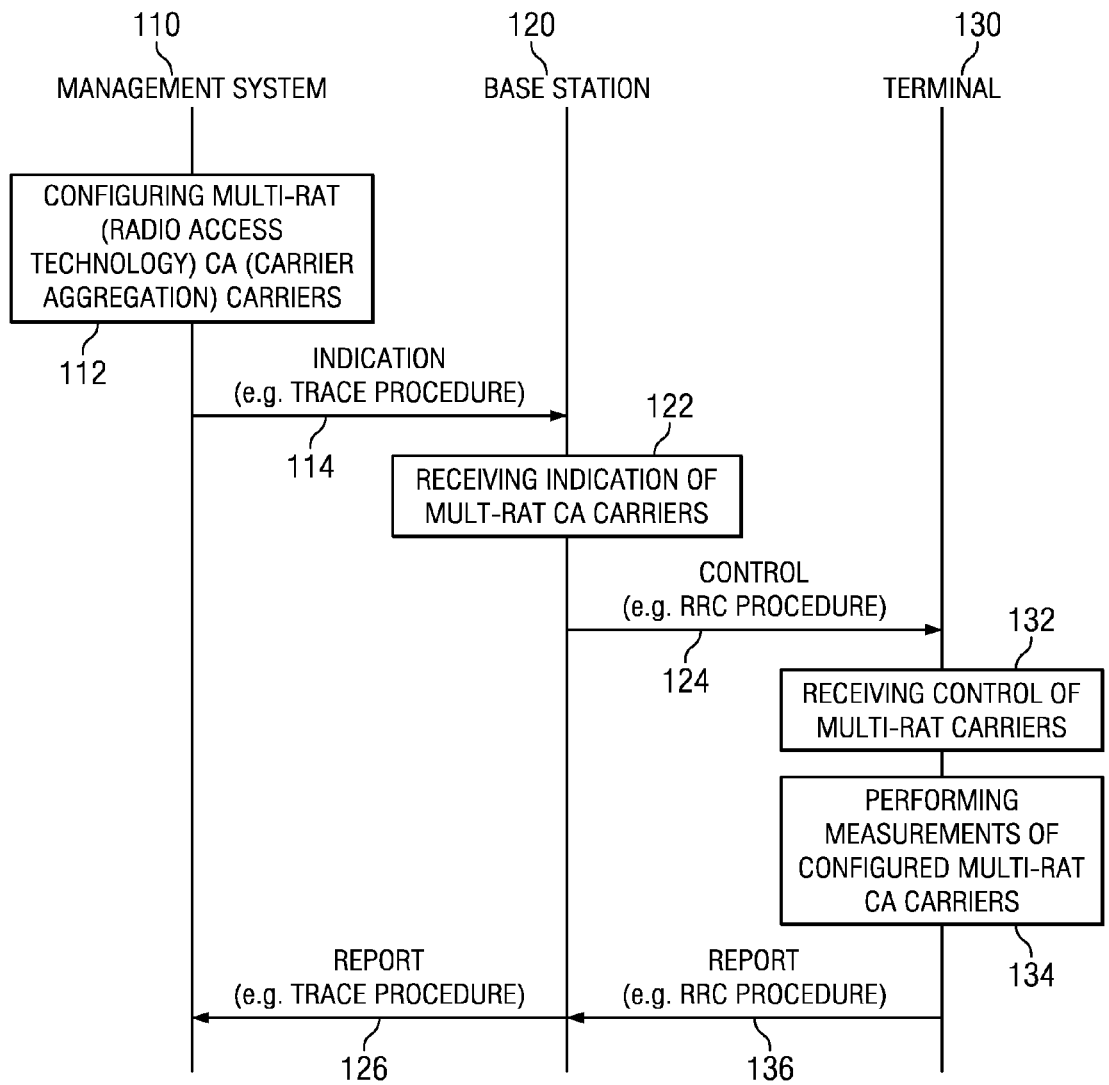
FIG. 1 depicts an example signaling for minimization of drive tests, MDT, configuration in a multi-RAT carrier aggregation, CA, system according to an example embodiment of the present invention.

FIG. 1 depicts an example signaling for MDT configuration in a multi-RAT CA system according to an example embodiment of the present invention. The multi-RAT CA system of FIG. 1 comprises a management system 110, at least one base station 120, and at least one terminal 130.

The management system 110 according to FIG. 1 may, for example, be an operation, administration and maintenance, OA&M, system, a trace collection entity, TCE. The base station 120 may, for example, be an enhanced Node B, eNB, a radio network controller, RNC, and/or the like. The terminal 130 may, for example, be a user equipment, UE, such as a mobile phone.

As shown in FIG. 1, the management system 110 according to embodiments of the present invention may be operative at block 112 for configuring multi-RAT CA carriers for terminal measurements relating to network performance on said carriers. The management system 110 at block 114 indicates the configuration information for terminal measurements towards the base station by using, for example, a trace procedure. Both measurements configuration and the report collection are carried out by the trace procedure defined between the management system 110 and the base station 120 to carry out the MDT measurements. In an example embodiment, the configuration information includes one measurement configuration for each RAT.

Further, the base station 120 according to embodiments of the present invention is operative at block 122 for receiving the indication sent by the management system 110 to indicate the configuration information of the multi-RAT CA carriers for terminal measurements. The base station 120 transmits the measurement configurations at block 124 with a measurement configuration for each RAT towards the terminal or terminals under its coverage to control the terminal measurements. The control includes the measurements to be done by the terminal 130 is transmitted by e.g. the radio resource control, RRC, connection control procedure.

Further, the terminal 130 according to embodiments of the present invention may be operative for receiving the control of configuration information defining the measurements of the multi-RAT CA carriers at block 132. The terminal performs measurements on the configured multi-RAT CA carriers according to the measurement configurations at block 134.

According to embodiments of the present invention, the management system 110, the base station 120 and the terminal 130 may further be operative for a corresponding reporting functionality. Reporting is done e.g. with the same procedures, RRC procedure 136 and trace procedure 126. The MDT measurement reports are sent to the base station 120 by dedicated RRC measurement reporting procedure 136. The base station 120 forwards the collected data to the management system 110 by the trace procedure 126.

According to embodiments of the present invention, the management system 110 may be specifically operative for deciding which carriers are needed or desired to collect the measurements and to establish a corresponding carrier configuration at block 112. The measurement may be configured to be performed in response to a determination that at least one condition comprised in configuration information relating to the measurement is fulfilled. Possible conditions include, for example, an active uplink and/or downlink transmission in a cell. This may mean that the measurement is configured to be performed/triggered in a cell where there is uplink and/or downlink traffic. In addition, other conditions are possible, for example, the conditions may define that measurements are to be performed/triggered when presence or non-presence of one of the radio access technologies is detected, which may be included in the configuration information.

Another example condition could be requirement on the location of the terminal 130 transmitting the uplink traffic or the location of the terminal 130 receiving the downlink traffic. In this case, a base station 120, for example, may determine the location of a transmitting terminal and direct another terminal to perform a measurement using the control at block 124. Thus under direction of a base station 120 the relative locations of terminals can be used as a condition for a measurement.

While the management system 110 may not have knowledge on the usage of multi-RAT CA carriers as primary and/or secondary carriers at certain terminals, such carrier configuration may eventually lead to different measurement scenarios at the terminal side. In this regard, the management system 110 according to embodiments of the present invention may be operative for determining a proper carrier configuration at block 112, e.g. depending on terminal capabilities. Further, the base station 120 according to embodiments of the present invention may be operative for controlling one or more terminals at block 124 depending on the carrier configuration. Still further, the terminal 130 according to embodiments of the present invention may be operative for performing terminal measurements at block 134 depending on the base station control 124 and/or the determined carrier configuration at block 112.

Figure 2:
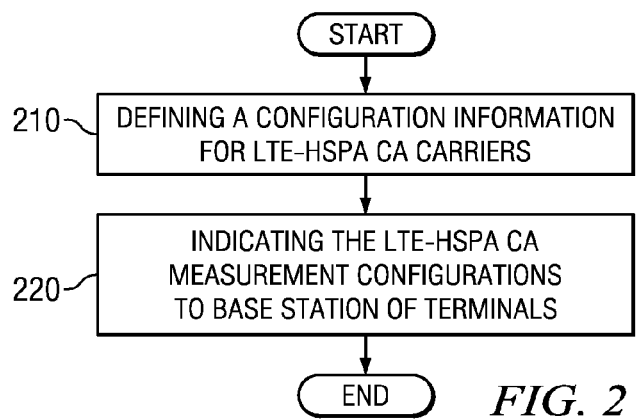
FIG. 2 depicts an example management system process for MDT configuration in long term evolution-high-speed packet access, LTE-HSPA, CA system according to an example embodiment of the present invention.
Figure 3:
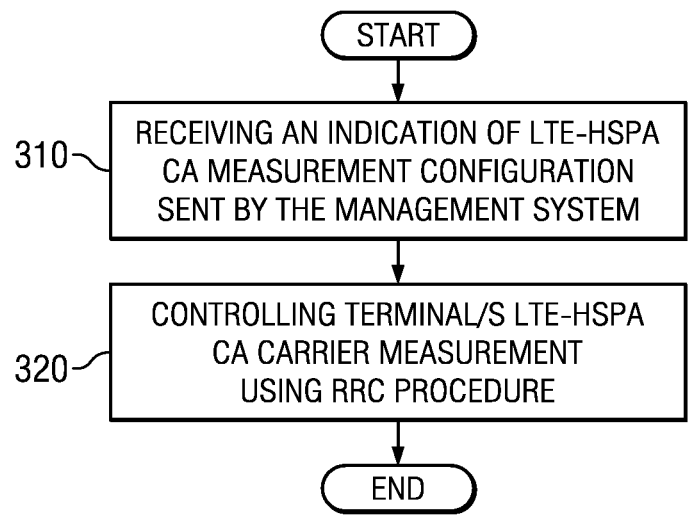
FIG. 3 depicts an example base station process for MDT configuration in LTE-HSPA CA system according to an example embodiment of the present invention.
Figure 4:
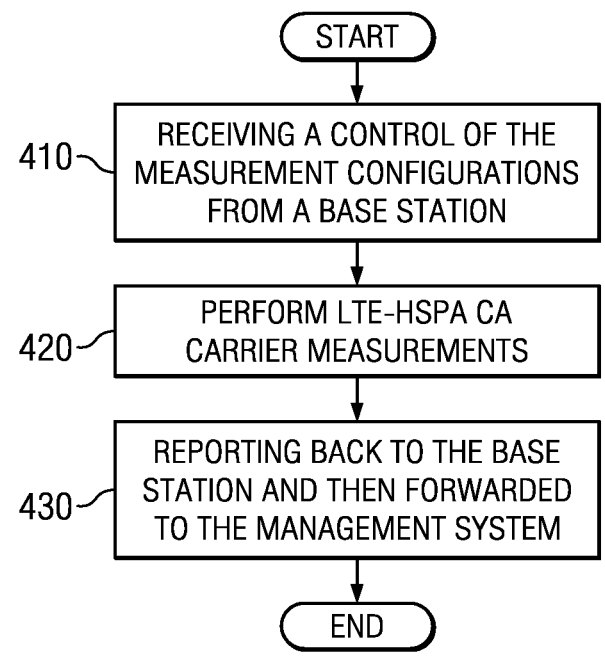
FIG. 4 depicts an example terminal process for MDT configuration in LTE-HSPA CA system according to an example embodiment of the present invention.

In FIG. 1, an example signaling for MDT configuration in multi-RAT CA system according to an example embodiment of the present invention is depicted. In FIG. 2 to FIG. 4, detail processes for the management system 110, base station 120, and terminal 130 according to an example embodiment of the present invention are illustrated using LTE-HSPA as an example multi-RAT system.

FIG. 2 depicts an example management system process for MDT configuration in LTE-HSPA CA system according to an example embodiment of the present invention. The example method according to FIG. 2 may be performed by or at a management system 110 according to FIG. 1. As shown in FIG. 2, a configuration information for LTE-HSPA CA carriers is defined at block 210. The configuration information includes the LTE-HSPA CA related information with one measurement At block 220, the configuration information with measurement configurations for LTE and HSPA may be indicated to the base station using, for example, the trace procedure. In an example embodiment, a single trace message includes the measurement configurations simultaneously for LTE and HSPA. The configuration information may be just an indication that the minimization of drive tests, MDT, report should differentiate the CA measurements from other inter-frequency measurements. In that regards, in an example embodiment, the measurements information includes only the identifications of LTE-HSPA CA carriers that are used for downlink transmission and conditions of the other carriers. According to another example embodiment of the present invention, the configuration may also explicitly list the LTE-HSPA CA frequencies, conditions and priorities that the MDT report should include.

FIG. 3 depicts an example base station process for MDT configuration in LTE-HSPA CA system according to an example embodiment of the present invention. The example method according to FIG. 3 may be performed by or at a base station 120 according to FIG. 1. As shown in FIG. 3, at block 310, an indication of a LTE-HSPA CA configuration information is received. In an example embodiment, the received indication is the same indication sent by a management system, for example at block 220 by the management system 110.

The indication may instruct terminal measurements with the configured LTE-HSPA CA carriers by way of a trace operation. The indication may activate a trace and/or a trace job for terminal measurements with the configuration of said LTE-HSPA CA carriers. The indication may also transmit a predetermined trace attribute and/or message defining the configuration of said carriers for terminal measurements. The predetermined trace attributes include the attributes for LTE plus the additional attributes introduced for HSPA.

At block 320, the received LTE-HSPA CA carrier configuration may be transmitted to one or more terminals using a reconfiguration procedure, for example, the RRC Connection Reconfiguration procedure, to control the LTE-HSPA carrier measurement. The configuration may be based on the existing RRC measurement procedures for configuration. In an example embodiment, the configuration identifies the cell(s), and carrier(s) to be measured, and any potential priorities for the measurements. The configuration includes not only the LTE measurement configuration but also the CA specific HSPA configuration. In the case when there are not many available terminals supporting measurement reporting in a CA scenario, the base station may adjust the length of a measurement period to reduce the impact on the selected terminals. In this case, the control may comprise the measurement period/duration for each carrier, e.g. in the respective RRC control message.

According to an example embodiment of the present invention, the measurements are performed in the respective terminal's RRC connected mode. MDT measurements are performed in Logged MDT when the terminal is in RRC idle mode and immediate MDT when the terminal is in RRC connected mode. MDT measurements are performed with immediate MDT when carriers are aggregated. This is because CA does not exist for idle mode. In idle mode, the terminal performs idle state mobility measurements based on a single carrier measurement results. In this regard, the carrier configuration may be controlled in a predetermined RRC attribute and/or message. The base station may be operative for mapping a received trace attribute and/or message into a RRC attribute and/or message for forwarding. Configuration information relating to measurements may be included in the control sent by the base station, for example, via RRCConnectionReconfiguration procedure. The measurement configurations may be signaled to the terminal with an extended LTE RRC measurement configuration message having additional information element, IE, for the HSPA measurement configuration.

According to an example embodiment of the present invention, the LTE-HSPA CA architecture employs a single LTE uplink connection to reduce the latency. In this regard, the measurement conditions can be limited to LTE as the measurement reporting is done only via LTE. HSPA measurement results are reported at the same time whatever results are available at that time instant. According to another example embodiment of the present invention, there can be also HSPA specific measurement conditions. HSPA events initiated measurement report is sent over LTE uplink with RRC measurement reporting.

FIG. 4 depicts an example terminal process for MDT configuration in LTE-HSPA CA system according to an example embodiment of the present invention. The example method according to FIG. 4 may be performed by or at a terminal 130 according to FIG. 1. As shown in FIG. 4, a control of a carrier configuration sent by the base station is received at block 410. In an example embodiment, the received control is the same control sent by a base station, for example at block 320 by base station 120. The configuration identifies the cell(s), and carrier(s) to be measured, and any potential priorities for the measurements. At block 420, terminal measurements may be performed based on the received measurement configurations for LTE and HSPA. The terminal may follow this configuration and add the requested information to the measurement report. Additionally, there could be information on which measurement results belong to the aggregated carriers, either as specified in the measurement configuration, or set autonomously by the terminal having the CA connection.

At block 430, the measurement results are reported back to the base station. In an example embodiment, time instants of the LTE and HSPA measurements are within a given time window in order for the CA specific results to be reliable. In an example embodiment, this is done either by synchronizing the measurements or checking the time alignment between the measurements. Both LTE and HSPA measurements are included in the report only if the time instants are within a time window. Such measurement results are reported using extended LTE measurement reports carrying also HSPA results, as there is no normal HSPA RRC connection. In an example embodiment, the report may be based on the existing RRC measurement procedures for reporting with the extension to include a location information in the measurement report. Only a single location information is included in the report so there is no separate location information for LTE and HSPA.

The terminal collects the measurement result to be reported to the network in such a way that the simultaneous measurement results and their conditions from the CA carriers can be identified. The identification could be e.g. a flag indication associated with those results that are from CA carriers. Other way could be to have a separate CA information element listing the frequencies and/or measurement results that can be considered as CA measurement results. Such information could be visible in the report send over the radio interface from the terminal to the base station as well as in the collected data that is forwarded from the base station to the management system.

Figure 5:
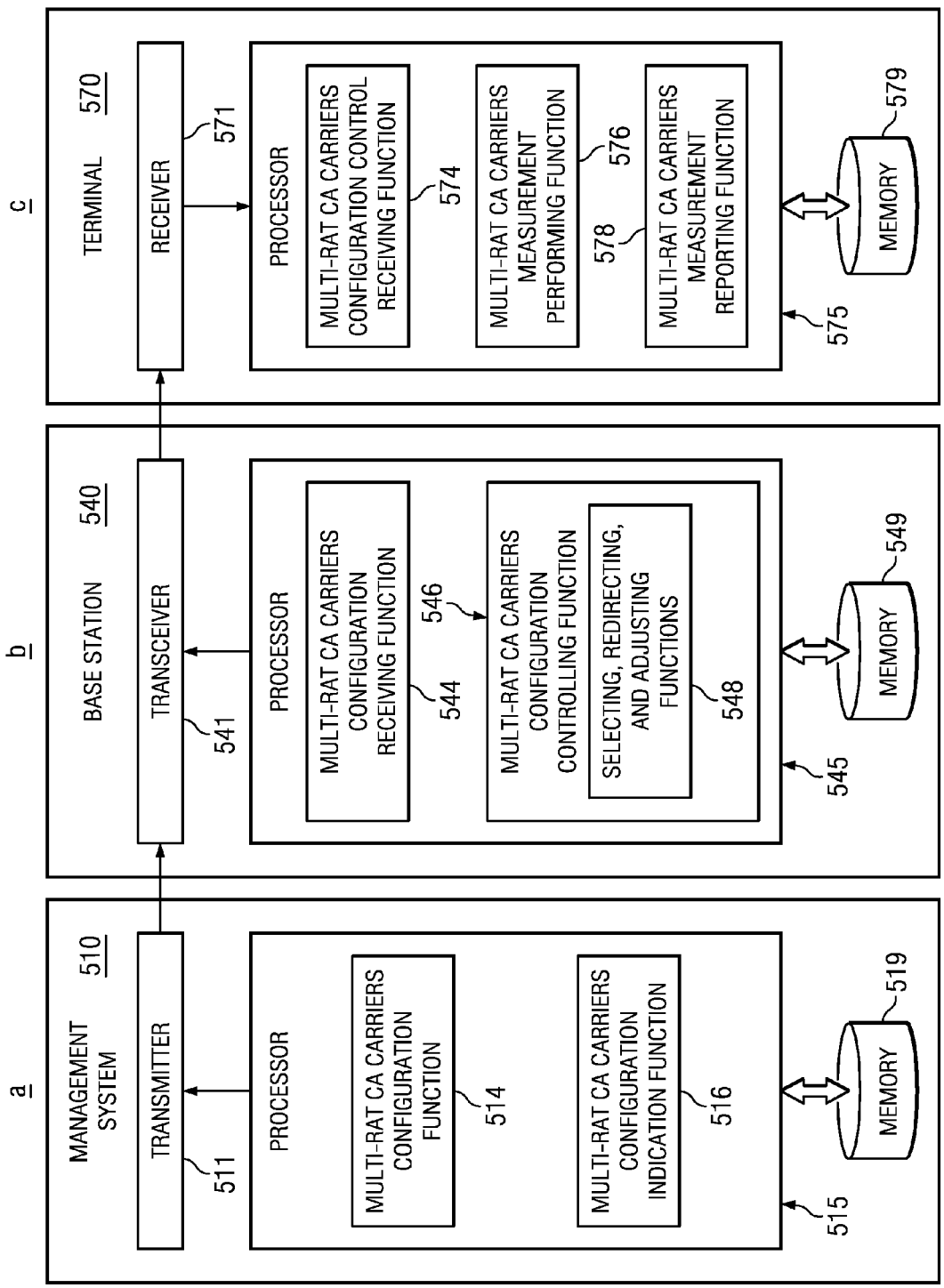
FIG. 5 depicts a schematic block diagram of example devices to operate a multi-RAT CA system according to an example embodiment of the present invention.

FIG. 5 depicts a schematic block diagram of example devices to operate a multi-RAT CA system according to an example embodiment of the present invention. The thus described apparatus on FIG. 5(a) may represent a or part of an apparatus such as a management system as described above, the thus described apparatus in FIG. 5(b) may represent a or part of a base station as described above, and the thus described apparatus on the FIG. 5(c) may represent a or part of an apparatus such as a terminal as described above.

As shown in FIG. 5(a), this apparatus 510 according to an example embodiment of the present invention comprises a processor 515 and a transmitter 511 as well as, optionally, a memory 519. Specifically, the processor 515 may be configured to configure multi-RAT CA carriers for terminal measurements relating to network performance on said carriers, thus representing means for configuring a multi-RAT CA carrier configuration 514. Further, the processor may be configured to indicate the configuration of said carriers towards a base station, thus representing means for indicating a multi-RAT CA carrier configuration 516. In other words, the processor may have a corresponding multi-RAT CA carrier configuring function 514 and a corresponding multi-RAT CA carrier configuration indication function 516.

As shown in FIG. 5(b), this apparatus 540 according to an example embodiment of the present invention comprises a processor 545 and a transceiver 541 as well as, optionally, a memory 549. Specifically, the processor may be configured to receive an indication of a configuration of multi-RAT CA carriers for terminal measurements relating to network performance on said carriers, thus representing means for receiving an indication of a multi-RAT CA carrier configuration. Further, the processor may be configured to control the configuration of said carriers for terminal measurements, thus representing means for controlling a multi-RAT CA carrier configuration for terminal measurements. In other words, the processor may have a corresponding multi-RAT CA carriers configuration receiving function 544 and a corresponding multi-RAT CA carriers configuration controlling function 546. Further, for controlling, the processor may be configured to select terminals based on the carriers to be measured, thus representing means for selecting terminals; the processor may be configured to redirect terminals to camp on a different primary carrier, thus representing means for redirecting terminals; the processor may be configured to adjust a period for terminal measurements at terminals for each configured carrier based on the carriers to be measured, thus representing means for adjusting a measurement period. In other words, the multi-RAT CA carriers configuration controlling function 546 may include at least one of a selecting function, a redirecting function and an adjusting function 548.

As shown in FIG. 5(c), this apparatus 570 according to an example embodiments of the present invention comprises a processor 575 and a receiver 571 as well as, optionally, a memory 579. Specifically, the processor may be configured to receive a control of a configuration of multi-RAT CA carriers for terminal measurements relating to network performance on said carriers, thus representing means for receiving a control of a multi-RAT CA carrier configuration. The processor may be configured to perform multi-RAT CA carriers measurements on the configured carriers according to the configuration of said carriers, thus representing means for performing multi-RAT CA carriers measurements. Further, the processor may be configured to report multi-RAT CA carriers measurements on the configured carriers according to the measurement results of said carriers, thus representing means for reporting multi-RAT CA carriers measurements. In other words, the processor may have a corresponding multi-RAT CA carriers configuration control receiving function 574, a multi-RAT CA carriers measurements performing function 576, and a multi-RAT CA carriers measurements reporting function 578.

Without in any way limiting the scope, interpretation, or application of the claims appearing below, a technical effect of one or more of the example embodiments disclosed herein is to provide the configuration information for one or more terminals. The configuration information comprises carriers for terminal measurements relating to network performance on these carriers. The configured carriers are carriers in a carrier aggregation. Another technical effect of one or more of the example embodiments disclosed herein is terminal measurements may be performed simultaneously on the configured carriers from different radio access technologies, for example, LTE and HSPA. Another technical effect of one or more of the example embodiments disclosed herein is the MDT support for multiple radio technologies.

Embodiments of the present invention may be implemented in software, hardware, application logic or a combination of software, hardware and application logic. The software, application logic and/or hardware may reside on management system, base station or terminal. If desired, part of the software, application logic and/or hardware may reside on management system, part of the software, application logic and/or hardware may reside on base station, and part of the software, application logic and/or hardware may reside on terminal. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 5. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims

What is claimed is:

1. A method comprising:
   receiving, at a terminal, configuration information for terminal measurements of carriers relating to network performance on the carriers, the carriers being carriers in a carrier aggregation for the terminal, the configuration information comprising at least two measurement configurations with at least one measurement configuration for a radio access technology;
   performing, by the terminal, terminal measurements on the carriers according to the configuration information, the terminal measurements being performed relate to immediate measurements for minimization of drive tests for reporting to a trace collection entity and/or an operation, administrative, and management system, the receiving and the performing being accomplished when in a radio resource control connected mode; and
   reporting, by the terminal, the terminal measurements on the carriers in the carrier aggregation to the trace collection entity and/or an operation, administrative, and management system, the terminal measurements enabling the minimization of drive tests.

2. The method according to claim 1, wherein the performing further comprises performing the terminal measurements in response to determining that at least one condition for at least one radio access technology is fulfilled.

3. The method according to claim 1, wherein the receiving further comprises receiving a predetermined radio resource control attribute and/or message defining the measurement configuration for the terminal measurements.

4. The method according to claim 1, further comprising: reporting the terminal measurements of the carriers when time instants of the measurement from each radio access technology are within a time window.

5. The method according to claim 1, further comprising: reporting the terminal measurements of the carriers with an indication about the carrier aggregation specific measurements.

6. An apparatus comprising:
at least one processor; and at least one memory including computer program code; the at least one memory and the computer program code configured to, with the at least one processor, cause the apparatus to at least:
define configuration information for terminal measurements of carriers relating to network performance on the carriers, the carriers being carriers in a carrier aggregation for one or more terminals, the terminal measurements relating to immediate measurements for minimization of drive tests; and
send an indication of the configuration information towards a base station of the one or more terminals, the configuration information comprising at least two measurement configurations with at least one measurement configuration for a radio access technology.

7. The apparatus of claim 6, wherein the configuration information comprises at least one condition for at least one radio access technology.

8. The apparatus of claim 7, wherein the condition comprises at least one of presence or non-presence of the radio access technology, location with respect to the base station of the radio access technology, presence of uplink traffic, presence of downlink traffic, location of the terminal transmitting the uplink traffic, and location of the terminal receiving the downlink traffic.

9. The apparatus of claim 6, wherein the indication comprises at least one of:
instructing the terminal measurements with the measurement configurations by way of a trace operation,
activating a trace and/or a trace job for terminal measurements with the measurement configurations, and
transmitting a predetermined trace attribute and/or message defining the measurement configurations for terminal measurements.

10. An apparatus comprising:
at least one processor; and at least one memory including computer program code; the at least one memory and the computer program code configured to, with the at least one processor, cause the apparatus to at least:
receive configuration information for terminal measurements relating to network performance on carriers, the carriers being carriers in a carrier aggregation from at least two radio access technologies, the configuration information comprising at least two measurement configurations at least one of which for a radio access technology;
perform terminal measurements on the carriers according to the configured measurement configurations, the terminal measurements being performed relate to immediate measurements for minimization of drive tests for reporting to a trace collection entity and/or an operation, administrative, and management system, the receiving and the performing being accomplished when in a radio resource control connected mode; and
report the terminal measurements on the carriers in the carrier aggregation to the trace collection entity and/or an operation, administrative, and management system, the reported terminal measurements enabling the minimization of drive tests.

11. The apparatus of claim 10, wherein the terminal measurements are performed comprises performing the terminal measurements in response to a determination that at least one condition for at least one radio access technology is fulfilled.

12. The apparatus of claim 10, wherein the received configuration information comprises a predetermined radio resource control attribute and/or a message defining the measurement configuration for terminal measurements.

13. The apparatus of claim 10, wherein the apparatus is further configured to at least report the terminal measurements of the carriers when time instants of the measurement from each radio access technology are within a time window.

14. The apparatus of claim 10, wherein the apparatus is further configured to at least report the terminal measurements of the carriers with an indication about the carrier aggregation specific measurements.

* * * * *